UNITED STATES PATENT OFFICE.

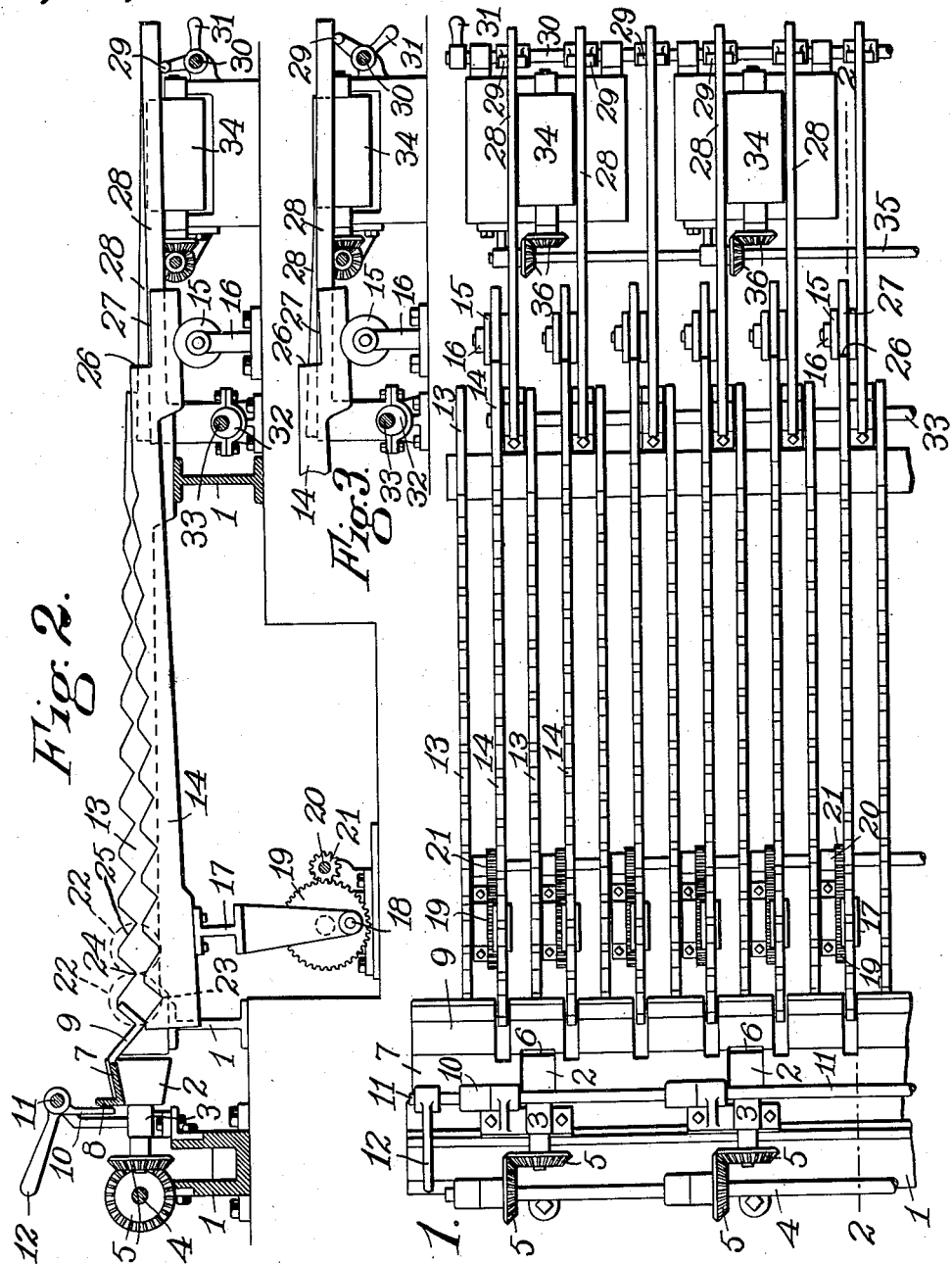

JEROME R. GEORGE, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

CONVEYER FOR METAL RODS.

1,139,027.  Specification of Letters Patent.  Patented May 11, 1915.

Application filed May 29, 1911. Serial No. 630,124.

*To all whom it may concern:*

Be it known that I, JEROME R. GEORGE, a citizen of the United States, residing at Worcester, in the county of Worcester and Commonwealth of Massachusetts, have invented a new and useful Improvement in Conveyers for Metal Rods, of which the following is a specification.

My invention relates to improvements in conveyers for metal rods, as shown in Patent No. 863,841, issued to me August 20, 1907, in which the rods are delivered by rolls to stationary supporting bars, from which the rods are lifted and moved forward by lifting and carrying bars by a step-by-step movement and finally delivered upon transporting rolls; and the objects of my improvement are, first, to simplify the mechanical construction by which the bars are operated; second, to render more efficient the construction for straightening the heated rods, and third, to increase the ease with which rods are transferred from the delivery rolls to the bars and from the bars to the transporting rolls.

I attain these objects by the mechanism illustrated in the accompanying drawings, in which—

Figure 1 is a plan view of a portion of my conveyer. Fig. 2 is a vertical section on the line 2—2, Fig. 1. Fig. 3 is a detail view of the transporting rolls.

Similar reference characters refer to similar parts in the different figures.

The conveyer is mounted on suitable supporting stands 1 and the metal rods are received from the rolling mill upon a series of conical rolls 2, two of which are shown in that portion of the conveyer represented in Fig. 1 of the accompanying drawings. The rolls 2 are journaled in bearings 3 and are driven from a common driving shaft 4 by beveled gears 5. The rolls 2 project upwardly through openings 6 in an angular trough shaped platform 7, having a vertical flange 8 at the side next the smaller ends of the conical rolls. As the rods are moved longitudinally upon the rolls 2, they are carried by gravity against the flange 8 which tends to straighten the rods. Adjacent the platform 7 is a right angled trough 9 into which the rods are pushed sidewise by swinging arms 10 carried upon a rocking shaft 11, in the present instance operated by an attendant by means of a lever handle 12. The swinging arms 10 move through openings in the flange 8 and push the rods up the inclined platform 7 and over into the angular trough 9. The sides of the trough 9 are equally inclined to a vertical plane, bisecting the angle between them, so that the rods as they are held in the trough will press equally against its opposite sides and thereby straighten the rods.

At the side of the trough 9 is a series of stationary conveyer bars 13 having their upper edges provided with a series of angular notches equally spaced but of gradually decreasing depth. Alternating with the stationary notched bars 13 is a series of movable bars 14, having similar angular notches in their upper edges corresponding with the notches of the stationary bars 13. The ends of the movable bars 14 farthest from the trough 9 rest upon rolls 15 journaled in stands 16. These supporting rolls 15 act as fulcrums to support the movable bars 14 beyond the ends of the stationary bars 13, so that the action of the movable bars 14 will be effective to carry the rods past the ends of the stationary bars.

Near the trough 9 the movable bars 14 are supported upon frames 17, which are pivoted at their lower ends upon crank pins 18 held in the gear wheels 19. The gear wheels 19 are driven from a common driving shaft 20 by pinions 21. By the rotation of the crank pins 18 an oscillating and sliding movement is imparted to the movable bars 14 upon the rolls 15 as fulcrums. By the movement of the bars 14 their notches are carried in more or less circular paths, as indicated by the broken lines 22, Fig. 2. By this movement of the movable bars a rod lying in the trough 9 will be taken up by the first notches 23 of the movable bars and carried from the trough 9 into the first notches 24 of the stationary bars, and by the next rotation of the crank pins 18 the rod will be removed from the notches 24 and carried into the notches 25, and so on until the rod has been deposited just beyond the last notches in the stationary bars. Although there are no notches beyond this point in the bars, their action will still move the rod outwardly till it drops over the shoulders 26 upon the conveyer bars 28, the shoulders 26 being located between the fulcrum supports or rolls 15 and the moved ends of the bars, or within those portions of the bars 14 which are subject to angular motion by the action of the crank pins 18. Each rod will also be pushed along by the following one if it has not already been moved along sufficiently by the action of the bars 13 and 14. As shown in Fig. 2, the shoulders 26 on the movable bars are located beyond the ends of the stationary bars 14, and this arrangement allows these shoulders 26 to effect transverse movement of the rods along the conveyer bars 28 after the rods have dropped over the said shoulders from the upper surfaces of the stationary and movable bars 13 and 14.

Overlapping the ends of the stationary and movable conveyer bars 13 and 14 is a set of conveyer bars 28, supported at their farthest ends upon rocking arms 29 carried upon a shaft 30, which is rocked by an attendant by means of a lever handle 31. The opposite ends of the conveyer bars 28 are supported upon eccentrics 32 carried upon a shaft 33 to which rotary motion is given from any convenient source of power, thereby imparting an oscillating and sliding movement to the conveyer bars 28 upon the fulcrum arms 29. The movement of the bars 28 is similar to that of the movable conveyer bars 14, but their upper surfaces are straight instead of notched. Journaled intermediate the conveyer bars 28 are conveyer rolls 34 driven from a common driving shaft 35 by means of bevel gears 36. By the movement of the conveyer bars 28, the rods delivered upon the conveyer bars 28 are lifted and moved toward the conveyer rolls 34, and when they have become assembled over the conveyer rolls 34, the shaft 30 is rocked from the position shown in Fig. 2 to that shown in Fig. 3, by which the conveyer bars are dropped below the plane of the upper surfaces of the conveyer rolls 34, causing the rods to be transferred from the supporting surfaces of the bars 28 to the rolls 34 and moved by them longitudinally.

As has been already pointed out, my improved conveyer comprises guiding means for directing the movement of a rod over a series of conical conveyer rolls; a flanged platform in alinement with the conveyer rolls for determining the position of the rods to effect their straightening; an angular trough into which the rods are pushed by a sidewise movement by mechanical means; conveyer bars operated from one end only to give them an oscillating movement, thereby increasing the simplicity of construction and the ease of operation, and a second series of conveyer bars having a similar oscillating movement and operated from one end only, from which the rods are delivered upon transferring rolls.

In the conveyer above described the stationary and movable bars 13 and 14 form the cooling bed of the conveyer. The movement of the bars 14 accomplishes the transference of the heated rods from one end of the cooling bed to the other. During the passage over the cooling bed the rods are straightened by the supporting angular notches of the bars while in a ductile state, acquiring sufficient rigidity as they reach the rolls 34 to allow them to be moved longitudinally thereon.

I am aware that a cooling bed comprising a series of alternating stationary and movable notched bars has been proposed and I do not herein claim such broadly. I am also aware that conical conveyer rolls have been heretofore proposed, having their smaller ends next the cooling bed and necessitating the use of movable stops or guide walls at the smaller ends of the rolls. By the present construction the guide wall or flange 8 is on the opposite side of the rolls 2 from the cooling bed.

I claim—

1. The combination with a series of conveyer rolls, of an angular trough at the side of said conveyer rolls, means for transferring rods from said rolls to said trough, a series of stationary bars arranged to receive the rods from said trough, a series of movable bars between said stationary bars, means for imparting a rotary movement in vertical planes to the ends of said movable bars next said conveyer rolls, fulcrums for said movable bars near their opposite ends, a second set of conveyer rolls, and means for transferring the rods to said second conveyer rolls.

2. In a conveyer for metal rods, the combination of stationary supporting bars, movable bars, with the upper surfaces of said stationary and said movable bars provided with a series of notches gradually decreasing in depth from one end of said bars, and means for imparting a rotary movement in vertical planes to the ends of said movable bars having the deepest notches.

3. In a conveyer for metal rods, the combination of a series of stationary bars having graduated angular notches, a series of conveyer rolls, means for guiding the rods in their progress over said rolls, an angular trough between said rolls and said stationary bars, a series of notched movable bars, and means for moving said movable bars in vertical planes to carry the rods from said angular trough to said stationary bars.

4. In a conveyer for metal rods, the combination with a series of supporting bars and a series of movable bars, said bars having their upper surfaces provided with corresponding angular notches and forming a cooling bed, means for operating said movable bars, a second series of conveyer bars arranged to receive the rods from said first series of supporting bars, means for imparting an angular and sliding movement to said second series of bars, and a series of conveyer rolls journaled between the bars of said second series.

5. In a conveyer for metal rods, the combination with a series of stationary supporting bars and of movable lifting bars, with their upper surfaces having corresponding notches, of means for imparting an angular and sliding movement to said lifting bars, a second series of conveyer bars arranged to receive the rods from said first series of supporting bars, means for imparting an angular movement to said second series of bars, conveyer rolls to receive the rods from said second series of conveyer bars, and means for lowering the supporting surfaces of said second series of conveyer bars below the supporting surfaces of said conveyer rolls.

6. In a conveyer for metal rods, a series of conveyer rolls, a series of stationary bars, a series of intervening movable bars, said stationary and said movable bars having V-shaped notches in their upper edges, a stationary support for said movable bars near one end, means for imparting an angular and a sliding movement to said movable bars on their stationary supports, said movable bars having vertical shoulders near their delivery ends by which the rods as they are delivered from said stationary bars are pushed sidewise.

7. In a conveyer for metal rods, a cooling bed comprising a series of stationary bars for supporting the rods to be cooled, a series of movable bars, stationary supports near the ends of said movable bars, a series of cranks for imparting a rotary motion in vertical planes to the opposite ends of said movable bars, said stationary and movable bars having a series of V-shaped notches in their upper sides gradually decreasing in depth from one end of the bars to the other end.

8. In a conveyer for metal rods, comprising a series of stationary rod supporting bars and a series of interposed movable bars, said bars having V-shaped notches in their upper surfaces and forming a cooling bed, means for imparting a rotative movement in a vertical plane to one end of each of said movable bars, fulcrum supports near the opposite ends of said movable bars, and shoulders formed in the supporting surfaces of said movable bars between the fulcrums and the moved ends of the bars.

9. In a conveyer for metal rods, a series of stationary rod supporting bars, a series of interposed movable bars, and a series of conveyer bars below and extending beyond the ends of said stationary and movable bars, the movable bars having shoulders beyond the ends of the stationary bars to effect transverse movement of rods on the conveyer bars.

10. In a conveyer for metal rods, a series of stationary rod supporting bars, a series of interposed movable bars, and rod supporting means below and extending beyond the ends of said stationary and movable bars, the movable bars having shoulders beyond the ends of the stationary bars to effect transverse movement of rods on said rod supporting means.

11. In a conveyer for metal rods, a series of stationary rod supporting bars, a series of interposed movable bars, said bars having depressions in their upper surfaces, the depressions being graduated in depth toward one end, means for imparting rotative movement to the end of each of the movable bars nearest the deepest depressions, and stationary fulcrums beyond the other ends of the stationary bars for supporting the movable bars near the shallowest depressions.

12. In a conveyer for metal rods, two series of rod supporting bars, the upper surfaces of said bars having depressions graduated in depth toward one end, and means for imparting rotative movement to each of the bars of one of said series nearest the deepest depressions.

13. In a conveyer for metal rods, two series of rod supporting bars, and means for imparting an angular and sliding movement to one end of each of the bars of one of said series, the upper surfaces of said movable bars having depressions decreasingly graduated in depth from their moved ends.

14. In a conveyer for metal rods, a series of rod supporting bars having their upper surfaces provided with depressions graduated in depth toward one end, and means for imparting an angular and sliding movement to the ends of said bars nearest their deepest depressions.

15. In a conveyer for metal rods, two series of rod supporting bars, the upper surfaces of the bars of one of said series having downwardly convergent depressions forming V-shaped notches graduated in depth toward one end, and means for imparting an angular and sliding movement to the ends of the bars in one series nearest their deepest depressions.

Dated this 24th day of May 1911.

JEROME R. GEORGE.

Witnesses:
   PENELOPE COMBERBACH,
   NELLIE WHALEN.